(12) United States Patent
Roddy et al.

(10) Patent No.: US 9,765,252 B2
(45) Date of Patent: Sep. 19, 2017

(54) SEALANT COMPOSITIONS AND METHODS UTILIZING NANO-PARTICLES

(71) Applicant: Halliburton Energy Services, Inc., Houston, TX (US)

(72) Inventors: Craig W. Roddy, Duncan, OK (US); Ricky L. Covington, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 18 days.

(21) Appl. No.: 14/928,555

(22) Filed: Oct. 30, 2015

(65) Prior Publication Data
US 2016/0053158 A1 Feb. 25, 2016

Related U.S. Application Data

(60) Division of application No. 12/567,783, filed on Sep. 27, 2009, now Pat. No. 9,206,344, which is a continuation-in-part of application No. 12/263,954, filed on Nov. 3, 2008, now Pat. No. 9,512,346, which is a continuation-in-part of application No. 11/747,002, filed on May 10, 2007, now Pat. No. 7,559,369.

(51) Int. Cl.
| | |
|---|---|
| *C09K 8/42* | (2006.01) |
| *C04B 7/00* | (2006.01) |
| *C04B 20/10* | (2006.01) |
| *C04B 28/02* | (2006.01) |
| *C04B 28/08* | (2006.01) |
| *C09K 8/46* | (2006.01) |
| *C09K 8/473* | (2006.01) |
| *C09K 8/50* | (2006.01) |
| *C09K 8/512* | (2006.01) |
| *C09K 8/518* | (2006.01) |
| *C04B 111/00* | (2006.01) |

(52) U.S. Cl.
CPC ............ *C09K 8/42* (2013.01); *C04B 7/00* (2013.01); *C04B 20/10* (2013.01); *C04B 28/02* (2013.01); *C04B 28/08* (2013.01); *C09K 8/426* (2013.01); *C09K 8/428* (2013.01); *C09K 8/46* (2013.01); *C09K 8/473* (2013.01); *C09K 8/50* (2013.01); *C09K 8/512* (2013.01); *C09K 8/518* (2013.01); *C04B 2111/00146* (2013.01); *C09K 2208/10* (2013.01); *Y02W 30/92* (2015.05); *Y02W 30/94* (2015.05); *Y02W 30/95* (2015.05)

(58) Field of Classification Search
None
See application file for complete search history.

(56) References Cited

U.S. PATENT DOCUMENTS

| | | |
|---|---|---|
| 2,094,316 A | 9/1937 | Cross et al. |
| 2,329,940 A | 9/1943 | Ponzer |
| 2,842,205 A | 7/1958 | Allen et al. |
| 2,848,051 A | 8/1958 | Willaims |
| 2,857,286 A | 10/1958 | Striker |
| 2,871,133 A | 1/1959 | Palonen et al. |
| 2,880,096 A | 3/1959 | Hurley |
| 2,890,169 A | 6/1959 | Prokop |
| 2,933,135 A | 4/1960 | Johnson |
| 2,945,769 A | 7/1960 | Gama et al. |
| 2,952,318 A | 9/1960 | Ritch |
| 2,959,223 A | 11/1960 | Harmon et al. |
| 2,978,024 A | 4/1961 | Davis |
| 3,026,938 A | 3/1962 | Huitt et al. |
| 3,079,268 A | 2/1963 | Brooks |
| 3,168,139 A | 2/1965 | Kennedy et al. |
| 3,219,112 A | 11/1965 | Sauber et al. |
| 3,336,979 A | 8/1967 | Ingraham et al. |
| 3,353,601 A | 11/1967 | Dollarhide et al. |
| 3,366,177 A | 1/1968 | Powers et al. |
| 3,381,748 A | 5/1968 | Peters et al. |
| 3,454,095 A | 7/1969 | Messenger et al. |
| 3,467,193 A | 9/1969 | Messenger |
| 3,499,491 A | 3/1970 | Wyant et al. |
| 3,557,876 A | 1/1971 | Tragesser |
| 3,607,326 A | 9/1971 | Serafin |
| RE27,271 E | 1/1972 | Hamsberger et al. |
| 3,748,159 A | 7/1973 | George |
| 3,854,985 A | 12/1974 | Suzuki et al. |
| 3,876,005 A | 4/1975 | Fincher et al. |
| 3,877,522 A | 4/1975 | Knight et al. |
| 3,887,009 A | 6/1975 | Miller et al. |

(Continued)

FOREIGN PATENT DOCUMENTS

| | | |
|---|---|---|
| CA | 2514492 | 9/2004 |
| CN | 101544488 | 9/2009 |

(Continued)

OTHER PUBLICATIONS

Canadian Office Action for Canadian Application No. 2,873,279 dated Dec. 21, 2015.
Final Office Action for U.S. Appl. No. 13/458,112, dated Jul. 8, 2015.
"Drilling Fluid Using PTFE Powder As a Lubricating Agent and Methods of Drilling in Subterranean Formations," Disclosed Anonymously on IP.com, Jan. 15, 2007.
Agarwhal et al. "Using Nanoparticles and Nanofluids to Tailor Transport Properties of Drilling Fluids to HTHP Operations," American Association of Drilling Engineers, 2009 National Technical Conference and Exhibition, 2009.

(Continued)

*Primary Examiner* — John J Figueroa
(74) *Attorney, Agent, or Firm* — Craig W. Roddy; Tumey LLP

(57) ABSTRACT

The present invention includes well treatment fluids and methods utilizing nano-particles and, in certain embodiments, to sealant compositions and methods utilizing nano-particles. The nano-particles may be incorporated into the sealant composition in different forms, including as discrete nano-particles, encapsulated nano-particles, agglomerated nano-particles, or in a liquid suspension.

24 Claims, No Drawings

(56) References Cited

U.S. PATENT DOCUMENTS

| | | | |
|---|---|---|---|
| 3,887,385 A | 6/1975 | Quist et al. |
| 3,888,311 A | 6/1975 | Cooke, Jr. |
| 3,958,638 A | 5/1976 | Johnston |
| 4,018,617 A | 4/1977 | Nicholson |
| 4,031,184 A | 6/1977 | McCord |
| 4,036,301 A | 7/1977 | Powers et al. |
| 4,142,910 A | 3/1979 | Kraemer et al. |
| 4,176,720 A | 12/1979 | Wilson |
| 4,202,413 A | 5/1980 | Messenger |
| 4,202,795 A | 5/1980 | Burnham et al. |
| 4,235,291 A | 11/1980 | Messenger |
| 4,268,316 A | 5/1981 | Wills et al. |
| 4,274,881 A | 6/1981 | Langton et al. |
| 4,284,433 A | 8/1981 | Aignesberger et al. |
| 4,341,562 A | 7/1982 | Ahlbeck |
| 4,353,746 A | 10/1982 | Birchall et al. |
| RE31,190 E | 3/1983 | Detroit et al. |
| 4,400,474 A | 8/1983 | Copperthwaite et al. |
| 4,407,677 A | 10/1983 | Wills et al. |
| 4,432,800 A | 2/1984 | Kneller et al. |
| 4,435,216 A | 3/1984 | Diehl et al. |
| 4,460,292 A | 7/1984 | Durham et al. |
| 4,494,990 A | 1/1985 | Harris |
| 4,506,734 A | 3/1985 | Nolte |
| 4,515,635 A | 5/1985 | Rao et al. |
| 4,519,452 A | 5/1985 | Tsao et al. |
| 4,555,269 A | 11/1985 | Rao et al. |
| 4,614,599 A | 9/1986 | Walker |
| 4,624,711 A | 11/1986 | Styron |
| 4,633,950 A | 1/1987 | Delhommer et al. |
| 4,643,362 A | 2/1987 | Serafin |
| 4,650,520 A | 3/1987 | Johnsen et al. |
| 4,660,642 A | 4/1987 | Young |
| 4,676,317 A | 6/1987 | Fry et al. |
| 4,676,832 A | 6/1987 | Childs et al. |
| 4,700,777 A | 10/1987 | Luers |
| 4,711,401 A | 12/1987 | Serafin |
| 4,721,160 A | 1/1988 | Parcevaux et al. |
| 4,741,401 A | 5/1988 | Walles et al. |
| 4,741,782 A | 5/1988 | Styron |
| 4,770,796 A | 9/1988 | Jacobs |
| 4,784,223 A | 11/1988 | Worrall et al. |
| 4,822,421 A | 4/1989 | Crabb |
| 4,848,973 A | 7/1989 | Yokota et al. |
| 4,883,125 A | 11/1989 | Wilson et al. |
| 4,941,536 A | 7/1990 | Brothers et al. |
| 4,953,620 A | 9/1990 | Bloys et al. |
| 4,961,790 A | 10/1990 | Smith et al. |
| 4,992,102 A | 2/1991 | Barbour |
| 5,030,366 A | 7/1991 | Wilson et al. |
| 5,049,288 A | 9/1991 | Brothers et al. |
| 5,058,679 A | 10/1991 | Hale et al. |
| RE33,747 E | 11/1991 | Hartley et al. |
| 5,086,850 A | 2/1992 | Harris et al. |
| 5,102,558 A | 4/1992 | McDougall et al. |
| 5,121,795 A | 6/1992 | Ewert et al. |
| 5,123,487 A | 6/1992 | Harris et al. |
| 5,125,455 A | 6/1992 | Harris et al. |
| 5,127,473 A | 7/1992 | Harris et al. |
| 5,149,370 A | 9/1992 | Olaussen et al. |
| 5,151,203 A | 9/1992 | Riley et al. |
| 5,183,505 A | 2/1993 | Spinney |
| 5,203,629 A | 4/1993 | Valle et al. |
| 5,207,832 A | 5/1993 | Baffreau et al. |
| 5,213,160 A | 5/1993 | Nahm et al. |
| 5,236,501 A | 8/1993 | Nomachi et al. |
| 5,238,064 A | 8/1993 | Dahl et al. |
| 5,253,991 A | 10/1993 | Yokota et al. |
| 5,263,542 A | 11/1993 | Brothers |
| 5,266,111 A | 11/1993 | Barbour |
| 5,292,512 A | 3/1994 | Schaefer et al. |
| 5,295,543 A | 3/1994 | Terry et al. |
| 5,305,831 A | 4/1994 | Nahm |
| 5,314,022 A | 5/1994 | Cowan et al. |
| 5,320,851 A | 6/1994 | de Mars et al. |
| 5,327,968 A | 7/1994 | Onan et al. |
| 5,337,824 A | 8/1994 | Cowan |
| 5,339,903 A | 8/1994 | Eoff et al. |
| 5,340,397 A | 8/1994 | Brothers |
| 5,346,012 A | 9/1994 | Heathman et al. |
| 5,352,288 A | 10/1994 | Mallow |
| 5,358,044 A | 10/1994 | Hale et al. |
| 5,358,047 A | 10/1994 | Himes et al. |
| 5,358,049 A | 10/1994 | Hale et al. |
| 5,361,841 A | 11/1994 | Hale et al. |
| 5,361,842 A | 11/1994 | Hale et al. |
| 5,368,103 A | 11/1994 | Heathman et al. |
| 5,370,185 A | 12/1994 | Cowan et al. |
| 5,372,641 A | 12/1994 | Carpenter |
| 5,373,901 A | 12/1994 | Norman et al. |
| 5,375,661 A | 12/1994 | Daneshy et al. |
| 5,382,290 A | 1/1995 | Nahm et al. |
| 5,383,521 A | 1/1995 | Onan et al. |
| 5,383,967 A | 1/1995 | Chase |
| 5,389,706 A * | 2/1995 | Heathman ............... C04B 24/16 166/292 |
| 5,398,758 A | 3/1995 | Onan et al. |
| 5,398,759 A | 3/1995 | Rodrigues et al. |
| 5,423,379 A | 6/1995 | Hale et al. |
| 5,439,056 A | 8/1995 | Cowan |
| 5,454,867 A | 10/1995 | Brothers et al. |
| 5,456,751 A | 10/1995 | Zandi et al. |
| 5,458,195 A | 10/1995 | Totten et al. |
| 5,464,060 A | 11/1995 | Hale et al. |
| 5,472,051 A | 12/1995 | Brothers |
| 5,476,142 A | 12/1995 | Kajita |
| 5,476,144 A | 12/1995 | Nahm et al. |
| 5,484,480 A | 1/1996 | Styron |
| 5,494,513 A | 2/1996 | Fu et al. |
| 5,499,677 A | 3/1996 | Cowan |
| 5,509,962 A | 4/1996 | Tang |
| 5,515,921 A | 5/1996 | Cowan et al. |
| 5,518,996 A | 5/1996 | Maroy et al. |
| 5,520,730 A | 5/1996 | Barbour |
| 5,529,624 A | 6/1996 | Riegler |
| 5,536,311 A | 7/1996 | Rodrigues |
| 5,542,782 A | 8/1996 | Carter et al. |
| 5,551,976 A | 9/1996 | Allen |
| 5,569,324 A | 10/1996 | Totten et al. |
| 5,575,841 A | 11/1996 | Dry |
| 5,580,379 A | 12/1996 | Cowan |
| 5,585,333 A | 12/1996 | Dahl et al. |
| 5,588,488 A | 12/1996 | Vijn et al. |
| 5,588,489 A | 12/1996 | Chatterji et al. |
| 5,603,961 A | 2/1997 | Suzuki et al. |
| 5,660,624 A | 8/1997 | Dry |
| 5,663,230 A | 9/1997 | Haman |
| 5,673,753 A | 10/1997 | Hale et al. |
| 5,688,844 A | 11/1997 | Chatterji et al. |
| 5,693,137 A | 12/1997 | Styron |
| 5,711,383 A | 1/1998 | Terry et al. |
| 5,716,910 A | 2/1998 | Totten et al. |
| 5,728,209 A | 3/1998 | Bury et al. |
| 5,728,654 A | 3/1998 | Dobson et al. |
| 5,741,357 A | 4/1998 | Sheikh |
| 5,766,323 A | 6/1998 | Butler et al. |
| 5,779,787 A | 7/1998 | Brothers et al. |
| 5,783,541 A | 7/1998 | Tack et al. |
| 5,795,060 A | 8/1998 | Stephens |
| 5,820,670 A | 10/1998 | Chatterji et al. |
| 5,851,960 A | 12/1998 | Totten et al. |
| 5,866,516 A | 2/1999 | Costin |
| 5,874,387 A | 2/1999 | Carpenter et al. |
| 5,879,699 A | 3/1999 | Lerner |
| 5,897,699 A | 4/1999 | Chatterji et al. |
| 5,900,053 A | 5/1999 | Brothers et al. |
| 5,913,364 A | 6/1999 | Sweatman |
| 5,988,279 A | 11/1999 | Udarbe et al. |
| 5,989,334 A | 11/1999 | Dry |
| 6,022,408 A | 2/2000 | Stokes et al. |
| 6,027,561 A | 2/2000 | Gruber et al. |
| 6,060,434 A | 5/2000 | Sweatman et al. |
| 6,060,535 A | 5/2000 | Villar et al. |
| 6,063,738 A | 5/2000 | Chatterji et al. |

(56) References Cited

U.S. PATENT DOCUMENTS

| | | | |
|---|---|---|---|
| 6,138,759 A | 10/2000 | Chatterji et al. |
| 6,143,069 A | 11/2000 | Brothers et al. |
| 6,145,591 A | 11/2000 | Boncan et al. |
| 6,153,562 A | 11/2000 | Villar et al. |
| 6,167,967 B1 | 1/2001 | Sweatman |
| 6,170,575 B1 | 1/2001 | Reddy et al. |
| 6,230,804 B1 | 5/2001 | Mueller et al. |
| 6,244,343 B1 | 6/2001 | Brothers et al. |
| 6,245,142 B1 | 6/2001 | Reddy et al. |
| 6,258,757 B1 | 7/2001 | Sweatman et al. |
| 6,261,360 B1 | 7/2001 | Dry |
| 6,277,189 B1 | 8/2001 | Chugh |
| 6,279,655 B1 | 8/2001 | Pafitis et al. |
| 6,312,515 B1 | 11/2001 | Barlet-Gouedard et al. |
| 6,315,042 B1 | 11/2001 | Griffith et al. |
| 6,332,921 B1 | 12/2001 | Brothers et al. |
| 6,367,550 B1 | 4/2002 | Chatterji et al. |
| 6,379,456 B1 | 4/2002 | Heathman et al. |
| 6,390,197 B1 | 5/2002 | Maroy |
| 6,402,833 B1 | 6/2002 | O'Hearn et al. |
| 6,409,819 B1 | 6/2002 | Ko |
| 6,444,316 B1 | 9/2002 | Reddy et al. |
| 6,457,524 B1 | 10/2002 | Roddy |
| 6,471,975 B1 | 10/2002 | Banovetz et al. |
| 6,478,869 B2 | 11/2002 | Reddy et al. |
| 6,488,763 B2 | 12/2002 | Brothers et al. |
| 6,488,764 B2 | 12/2002 | Westerman |
| 6,494,951 B1 | 12/2002 | Reddy et al. |
| 6,500,252 B1 | 12/2002 | Chatterji et al. |
| 6,500,253 B2 | 12/2002 | Norman et al. |
| 6,502,636 B2 | 1/2003 | Chatterji et al. |
| 6,508,305 B1 | 1/2003 | Brannon et al. |
| 6,524,384 B2 | 2/2003 | Griffith et al. |
| 6,527,051 B1 | 3/2003 | Reddy et al. |
| 6,527,849 B2 | 3/2003 | Dry |
| 6,547,871 B2 | 4/2003 | Chatterji et al. |
| 6,547,891 B2 | 4/2003 | Linden et al. |
| 6,554,067 B1 | 4/2003 | Davies et al. |
| 6,554,071 B1 | 4/2003 | Reddy et al. |
| 6,561,273 B2 | 5/2003 | Brothers et al. |
| 6,562,122 B2 | 5/2003 | Dao et al. |
| 6,565,647 B1 | 5/2003 | Day et al. |
| 6,572,697 B2 | 6/2003 | Gleeson et al. |
| 6,599,863 B1 | 7/2003 | Palmer et al. |
| 6,610,139 B2 | 8/2003 | Reddy et al. |
| 6,626,243 B1 | 9/2003 | Go Boncan |
| 6,631,766 B2 | 10/2003 | Brothers et al. |
| 6,632,527 B1 | 10/2003 | McDaniel et al. |
| 6,645,288 B1 | 11/2003 | Dargaud et al. |
| 6,645,290 B1 | 11/2003 | Barbour |
| 6,648,962 B2 | 11/2003 | Berke et al. |
| 6,656,265 B1 | 12/2003 | Garnier et al. |
| 6,660,080 B2 | 12/2003 | Reddy et al. |
| 6,666,268 B2 | 12/2003 | Griffith et al. |
| 6,668,929 B2 | 12/2003 | Griffith et al. |
| 6,689,208 B1 | 2/2004 | Brothers |
| 6,702,044 B2 | 3/2004 | Reddy et al. |
| 6,706,108 B2 | 3/2004 | Polston |
| 6,716,282 B2 | 4/2004 | Griffith et al. |
| 6,729,405 B2 | 5/2004 | DiLullo et al. |
| 6,767,398 B2 | 7/2004 | Trato |
| 6,776,237 B2 | 8/2004 | Dao et al. |
| 6,796,378 B2 | 9/2004 | Reddy et al. |
| 6,797,054 B2 | 9/2004 | Chatterji et al. |
| 6,808,561 B2 | 10/2004 | Genge |
| 6,811,603 B2 | 11/2004 | Brothers et al. |
| 6,823,940 B2 | 11/2004 | Reddy et al. |
| 6,832,651 B2 | 12/2004 | Ravi et al. |
| 6,835,243 B2 | 12/2004 | Brothers et al. |
| 6,837,316 B2 | 1/2005 | Reddy et al. |
| 6,840,318 B2 | 1/2005 | Lee |
| 6,846,357 B2 | 1/2005 | Reddy et al. |
| 6,848,519 B2 | 2/2005 | Reddy et al. |
| 6,861,392 B2 | 3/2005 | Shaarpour |
| 6,874,578 B1 * | 4/2005 | Garnier .................. C04B 28/02 166/293 |
| 6,883,609 B2 | 4/2005 | Drochon et al. |
| 6,887,833 B2 | 5/2005 | Brothers et al. |
| 6,889,767 B2 | 5/2005 | Reddy et al. |
| 6,902,001 B2 | 6/2005 | Dargaud et al. |
| 6,904,971 B2 | 6/2005 | Brothers et al. |
| 6,907,929 B2 | 6/2005 | LeRoy-Delage et al. |
| 6,908,508 B2 | 6/2005 | Brothers |
| 6,911,078 B2 | 6/2005 | Barlet-Gouedard et al. |
| 6,926,081 B2 | 8/2005 | Sweatman et al. |
| 6,962,201 B2 | 11/2005 | Brothers |
| 7,007,755 B2 | 3/2006 | Reddy et al. |
| 7,022,179 B1 | 4/2006 | Dry |
| 7,026,272 B2 | 4/2006 | Reddy et al. |
| 7,032,664 B2 | 4/2006 | Lord et al. |
| 7,033,975 B2 | 4/2006 | Baran et al. |
| 7,048,053 B2 | 5/2006 | Santra et al. |
| 7,059,415 B2 | 6/2006 | Bosma et al. |
| 7,077,203 B1 | 7/2006 | Roddy et al. |
| 7,084,092 B2 | 8/2006 | Patel et al. |
| 7,086,466 B2 | 8/2006 | Roddy |
| 7,138,446 B2 | 11/2006 | Reddy et al. |
| 7,143,828 B2 | 12/2006 | Reddy et al. |
| 7,143,832 B2 | 12/2006 | Freyer |
| 7,156,173 B2 | 1/2007 | Mueller |
| 7,156,174 B2 | 1/2007 | Roddy et al. |
| 7,172,022 B2 | 2/2007 | Reddy et al. |
| 7,174,962 B1 | 2/2007 | Roddy et al. |
| 7,182,137 B2 | 2/2007 | Fyten et al. |
| 7,199,086 B1 | 4/2007 | Roddy et al. |
| 7,204,307 B2 | 4/2007 | Roddy et al. |
| 7,204,310 B1 | 4/2007 | Roddy et al. |
| 7,204,312 B2 | 4/2007 | Roddy et al. |
| 7,213,646 B2 | 5/2007 | Roddy et al. |
| 7,264,053 B2 | 9/2007 | Vargo, Jr. et al. |
| 7,279,447 B2 | 10/2007 | Lal et al. |
| 7,284,609 B2 | 10/2007 | Roddy et al. |
| 7,284,611 B2 | 10/2007 | Reddy et al. |
| 7,294,194 B2 | 11/2007 | Reddy et al. |
| 7,296,597 B1 | 11/2007 | Freyer et al. |
| 7,303,014 B2 | 12/2007 | Reddy et al. |
| 7,335,252 B2 | 2/2008 | Roddy et al. |
| 7,337,841 B2 | 3/2008 | Ravi |
| 7,337,842 B2 | 3/2008 | Roddy et al. |
| 7,338,923 B2 | 3/2008 | Roddy et al. |
| 7,341,104 B2 | 3/2008 | Roddy et al. |
| 7,351,279 B2 | 4/2008 | Brothers |
| 7,353,870 B2 | 4/2008 | Roddy et al. |
| 7,381,263 B2 | 6/2008 | Roddy et al. |
| 7,387,675 B2 | 6/2008 | Roddy et al. |
| 7,393,407 B2 | 7/2008 | Dingsoyr et al. |
| 7,395,860 B2 | 7/2008 | Roddy et al. |
| 7,404,440 B2 | 7/2008 | Reddy et al. |
| 7,409,991 B2 | 8/2008 | Reddy et al. |
| 7,422,060 B2 | 9/2008 | Hammami et al. |
| 7,424,913 B2 | 9/2008 | Roddy |
| 7,445,669 B2 | 11/2008 | Roddy et al. |
| 7,451,817 B2 | 11/2008 | Reddy et al. |
| 7,461,696 B2 | 12/2008 | Nguyen et al. |
| 7,478,675 B2 | 1/2009 | Roddy et al. |
| 7,482,309 B2 | 1/2009 | Ravi et al. |
| 7,559,369 B2 | 7/2009 | Roddy et al. |
| 7,784,542 B2 | 8/2010 | Roddy et al. |
| 7,806,183 B2 | 10/2010 | Roddy et al. |
| 7,846,876 B2 | 12/2010 | Koyanagi |
| 7,892,352 B2 | 2/2011 | Roddy et al. |
| 8,114,820 B2 | 2/2012 | Crewes |
| 8,202,824 B2 | 6/2012 | Reddy et al. |
| 8,226,879 B2 | 7/2012 | Genolet et al. |
| 8,394,744 B2 | 3/2013 | Woytowich et al. |
| 8,499,837 B2 | 8/2013 | Koons |
| 8,586,512 B2 | 11/2013 | Roddy et al. |
| 8,598,093 B2 | 12/2013 | Roddy et al. |
| 8,603,952 B2 | 12/2013 | Roddy et al. |
| 8,609,595 B2 | 12/2013 | Morgan et al. |
| 8,685,903 B2 | 4/2014 | Ravi et al. |
| 8,822,386 B2 | 9/2014 | Quintero et al. |
| 2002/0004464 A1 | 1/2002 | Nelson et al. |

(56) References Cited

U.S. PATENT DOCUMENTS

| | | |
|---|---|---|
| 2002/0033121 A1 | 3/2002 | Marko |
| 2002/0073894 A1 | 6/2002 | Genge et al. |
| 2002/0073897 A1 | 6/2002 | Trato |
| 2002/0117090 A1 | 8/2002 | Ku |
| 2002/0193257 A1 | 12/2002 | Lee et al. |
| 2003/0089281 A1 | 5/2003 | Berke et al. |
| 2003/0116065 A1 | 6/2003 | Griffith et al. |
| 2003/0116887 A1 | 6/2003 | Scott |
| 2003/0134751 A1 | 7/2003 | Lee et al. |
| 2003/0167970 A1 | 9/2003 | Polston |
| 2003/0168215 A1 | 9/2003 | Drochon et al. |
| 2003/0220204 A1 | 11/2003 | Baran et al. |
| 2003/0234103 A1 | 12/2003 | Lee et al. |
| 2004/0007162 A1 | 1/2004 | Morioka et al. |
| 2004/0040475 A1 | 3/2004 | De La Roij et al. |
| 2004/0055748 A1 | 3/2004 | Reddy et al. |
| 2004/0079260 A1 | 4/2004 | Datta et al. |
| 2004/0107877 A1 | 6/2004 | Getzlaf et al. |
| 2004/0108113 A1 | 6/2004 | Luke et al. |
| 2004/0112600 A1 | 6/2004 | Luke et al. |
| 2004/0121916 A1 | 6/2004 | Kono |
| 2004/0144537 A1 | 7/2004 | Reddy et al. |
| 2004/0171499 A1 | 9/2004 | Ravi et al. |
| 2004/0187740 A1 | 9/2004 | Timmons |
| 2004/0188091 A1 | 9/2004 | Luke et al. |
| 2004/0191439 A1 | 9/2004 | Bour et al. |
| 2004/0211562 A1 | 10/2004 | Brothers et al. |
| 2004/0211564 A1 | 10/2004 | Brothers et al. |
| 2004/0244650 A1 | 12/2004 | Brothers |
| 2004/0244977 A1 | 12/2004 | Luke et al. |
| 2004/0256102 A1 | 12/2004 | Trato |
| 2004/0261990 A1 | 12/2004 | Bosma et al. |
| 2004/0261999 A1 | 12/2004 | Nguyen |
| 2005/0000734 A1 | 1/2005 | Getzlaf et al. |
| 2005/0022991 A1 | 2/2005 | Rao |
| 2005/0034867 A1 | 2/2005 | Griffith et al. |
| 2005/0056191 A1 | 3/2005 | Brothers et al. |
| 2005/0061206 A1 | 3/2005 | Reddy et al. |
| 2005/0072599 A1 | 4/2005 | Luke et al. |
| 2005/0084334 A1 | 4/2005 | Shi et al. |
| 2005/0096207 A1 | 5/2005 | Urbanek |
| 2005/0098317 A1 | 5/2005 | Reddy et al. |
| 2005/0113260 A1 | 5/2005 | Wood |
| 2005/0113262 A1 | 5/2005 | Ravi et al. |
| 2005/0133221 A1 | 6/2005 | Chatterji et al. |
| 2005/0173117 A1 | 8/2005 | Roddy |
| 2005/0199401 A1 | 9/2005 | Patel et al. |
| 2006/0016598 A1 | 1/2006 | Urbanek |
| 2006/0025312 A1 | 2/2006 | Santra et al. |
| 2006/0086503 A1 | 4/2006 | Reddy et al. |
| 2006/0089851 A1 | 4/2006 | Silby et al. |
| 2006/0122071 A1 | 6/2006 | Reddy et al. |
| 2006/0162926 A1 | 7/2006 | Roddy |
| 2006/0166834 A1 | 7/2006 | Roddy |
| 2006/0177661 A1 | 8/2006 | Smith et al. |
| 2006/0260512 A1 | 11/2006 | Nordmeyer |
| 2006/0260513 A1 | 11/2006 | Porro Guiterrez et al. |
| 2006/0278131 A1 | 12/2006 | Hunt |
| 2007/0012436 A1 | 1/2007 | Freyer |
| 2007/0015668 A1 | 1/2007 | Harrower et al. |
| 2007/0017676 A1 | 1/2007 | Reddy et al. |
| 2007/0056475 A1 | 3/2007 | Roddy et al. |
| 2007/0056479 A1 | 3/2007 | Gray |
| 2007/0056732 A1 | 3/2007 | Roddy et al. |
| 2007/0056733 A1 | 3/2007 | Roddy et al. |
| 2007/0062691 A1 | 3/2007 | Reddy et al. |
| 2007/0102157 A1 | 5/2007 | Rodldy et al. |
| 2007/0125534 A1 | 6/2007 | Reddy et al. |
| 2007/0137528 A1 | 6/2007 | LeRoy-Deluge et al. |
| 2007/0151484 A1 | 7/2007 | Reddy et al. |
| 2007/0151724 A1 | 7/2007 | Ohmer et al. |
| 2007/0151730 A1 | 7/2007 | Reddy et al. |
| 2007/0186820 A1 | 8/2007 | O'Hearn |
| 2007/0204765 A1 | 9/2007 | LeRoy-Deluge et al. |
| 2007/0227734 A1 | 10/2007 | Freyer |
| 2007/0246225 A1 | 10/2007 | Hailey, Jr. et al. |
| 2007/0255457 A1 | 11/2007 | Whitcomb et al. |
| 2007/0266903 A1 | 11/2007 | Gartner et al. |
| 2008/0017376 A1 | 1/2008 | Badalamenti et al. |
| 2008/0058229 A1 | 3/2008 | Berkland et al. |
| 2008/0099203 A1 | 5/2008 | Mueller et al. |
| 2008/0108524 A1 | 5/2008 | Willberg et al. |
| 2008/0135250 A1 | 6/2008 | Bosma et al. |
| 2008/0156491 A1 | 7/2008 | Roddy et al. |
| 2008/0261027 A1 | 10/2008 | Li et al. |
| 2008/0261834 A1 | 10/2008 | Simon |
| 2008/0277116 A1 | 11/2008 | Roddy et al. |
| 2009/0088348 A1 | 4/2009 | Roddy |
| 2009/0114126 A1 | 5/2009 | Roddy |
| 2009/0120644 A1 | 5/2009 | Roddy |
| 2009/0124522 A1 | 5/2009 | Roddy |
| 2009/0139719 A1 | 6/2009 | Luo |
| 2009/0200029 A1 | 8/2009 | Roddy et al. |
| 2009/0236097 A1 | 9/2009 | Roddy |
| 2009/0260544 A1 | 10/2009 | Roddy |
| 2009/0312201 A1 | 12/2009 | Huang et al. |
| 2010/0016183 A1 | 1/2010 | Roddy et al. |
| 2010/0025039 A1 | 2/2010 | Roddy et al. |
| 2010/0075784 A1 | 3/2010 | Perera Mercado et al. |
| 2010/0095871 A1 | 4/2010 | Patil et al. |
| 2010/0096135 A1 | 4/2010 | Roddy et al. |
| 2011/0162845 A1 | 7/2011 | Ravi et al. |
| 2011/0237467 A1 | 9/2011 | Cornette |
| 2011/0312857 A1 | 12/2011 | Amanullah |
| 2013/0312641 A1 | 11/2013 | Chatterji et al. |

FOREIGN PATENT DOCUMENTS

| | | |
|---|---|---|
| DE | 102007042078 | 3/2009 |
| DE | 102007059424 A | 6/2009 |
| EP | 0748782 | 12/1885 |
| EP | 1686234 A1 | 8/2006 |
| EP | 1719741 A1 | 11/2006 |
| EP | 2465910 A1 | 11/2009 |
| FR | 2787105 | 6/2000 |
| WO | WO 90/11977 | 4/1990 |
| WO | WO 9011977 | 10/1990 |
| WO | WO 0050357 A1 | 8/2000 |
| WO | WO 0187796 A1 | 11/2001 |
| WO | WO 2008034461 | 3/2008 |
| WO | WO 2009030758 | 3/2009 |

OTHER PUBLICATIONS

Tran et al. "Nanofluids for Use as Ultra-Deep Drilling Fluids,", Jan. 2007.
Notice of Allowance from USPTO for U.S. Appl. No. 13/052,471, dated Jan. 30, 2014.
HES FlexPlug Services Brochure, 2008.
HES Thermatak Services Brochure, 2005.
HES Fuse-It Circulation Treatment Brochure, 2005.
Office Action from USPTO for U.S. Appl. No. 13/458,112, dated Apr. 29, 2014.
Final Office Action from USPTO for U.S. Appl. No. 13/435,701, dated Feb. 20, 2014.
Office Action from USPTO for U.S. Appl. No. 13/620,013, dated Jan. 30, 2014.
EPO Office Action for EP Patent Serial Application No. 09751959. 9, dated Sep. 27, 2013.
Office action for U.S. Appl. No. 12/263,954, dated Oct. 8, 2013.
Office Action for U.S. Appl. No. 13/435,701, dated Oct. 4, 2013.
Final Office Action for U.S. Appl. No. 13/458,112, dated Dec. 26, 2013.
Final Office Action from USPTO for U.S. Appl. No. 12/263,954, dated Mar. 14, 2013.
Final Office Action from USPTO for U.S. Appl. No. 13/458,112, dated Mar. 15, 2013.
International Preliminary Examination Report for PCT/GB2009/ 002596, dated May 3, 2011.
Final Office Action from USPTO for U.S. Appl. No. 12/833,189, dated May 28, 2013.

(56) References Cited

OTHER PUBLICATIONS

Final Office Action from USPTO for U.S. Appl. No. 13/435,701, dated Jun. 4, 2013.
Office Action from USPTO for U.S. Appl. No. 12/567,782, dated Jun. 21, 2013.
Office Action from USPTO for U.S. Appl. No. 13/443,934, dated Jun. 27, 2013.
Final Office Action from USPTO for U.S. Appl. No. 13/052,471, dated May 10, 2013.
Office Action from USPTO for U.S. Appl. No. 13/431,701, dated Jul. 11, 2013.
Search Report and Written Opinion for PCT/US2013/038343, dated Jul. 31, 2013.
Andrew R. Barron, Chemical composition of Portland Cement, Jan. 4, 2010.
International Preliminary Report and Written Opinion of PCT/GB2010/001806, dated Mar. 27, 2012.
Office Action from USPTO for U.S. Appl. No. 13/458,112, dated Sep. 5, 2013.
Final Office Action from USPTO for U.S. Appl. No. 12/567,782, dated Feb. 8, 2013.
Final Office Action from USPTO for U.S. Appl. No. 13/435,701, dated Feb. 19, 2013.
Office Action from USPTO for U.S. Appl. No. 12/651,662, dated Feb. 13, 2013.
Office Action from USPTO for U.S. Appl. No. 12/833,189, dated Feb. 6, 2013.
Final Office Action from USPTO for U.S. Appl. No. 13/443,934, dated Mar. 4, 2013.
International Search Report and Written Opinion for PCT/GB2010/001045, dated Jul. 21, 2010.
Office Action from USPTO for U.S. Appl. No. 13/052,471, dated Feb. 4, 2013.
International Search Report for PCT/GB2010/001805, dated Mar. 31, 2011.
Written Opinion for PCT/GB2010/00180, dated Mar. 27, 2012.
Office Action from USPTO for U.S. Appl. No. 13/431,701, dated Nov. 9, 2012.
Office Action from USPTO for U.S. Appl. No. 12/567,782, dated Jul. 25, 2012.
Office Action from USPTO for U.S. Appl. No. 12/651,662, dated Aug. 2, 2012.
Final Office Action from USPTO for U.S. Appl. No. 13/052,471, dated Jun. 28, 2012.
Written Opinion of International Searching Authority for PCT/GB/2010/000485, dated Oct. 25, 2011.
Written Opinion of International Searching Authority for PCT/GB/2011/000003, dated Jul. 4, 2012.
Communication from EPO for EPO Application No. 12159772.8, dated May 3, 2012.
Li et al., "Investigations of the preparation and mechanical properties of the nano-alumina reinforced cement composite", Science Direct, Materials Letters 60, pp. 356-359, 2006.
Final Office Action from USPTO for U.S. Appl. No. 12/567,782, dated Mar. 2, 2012.
Office Action from USPTO for U.S. Appl. No. 13/052,471, dated Mar. 6, 2012.
Final Office Action from USPTO for U.S. Appl. No. 12/651,662, dated Mar. 14, 2012.
Office Action from USPTO for U.S. Appl. No. 12/833,189, dated Feb. 7, 2012.
HES Brochure "Latex 2000", Aug. 2006.
Office Action from USPTO for U.S. Appl. No. 12/651,662, dated Nov. 28, 2011.
Final Office Action from USPTO for U.S. Appl. No. 12/263,954, dated Aug. 8, 2011.
Office Action from USPTO for U.S. Appl. No. 12/833,189, dated Jul. 18, 2011.
Campillo et al., "Improvement of initial mechanical strength by nanoalumnia in belite cements", Science Direct, Materials Letters 61, pp. 1889-1892, 2007.
PCT International Search Report and Written Opinion for Application No. PCT/GB2011/00003, dated Apr. 18, 2011.
Office Action from USPTO for U.S. Appl. No. 12/263,954, dated Apr. 20, 2011.
Final Office Action from USPTO for U.S. Appl. No. 12/833,189, dated May 16, 2011.
"Effects of the particle size on the micro and nanostructural features of calcium phosphate cement: a kinetic analysis", Biomaterials 25, 2004, pp. 3452-3462.
Office Action from USPTO for U.S. Appl. No. 12/567,782, dated Apr. 5, 2011.
Office Action from USPTO for U.S. Appl. No. 12/651,662, dated Apr. 5, 2011.
Office Action from USPTO for U.S. Appl. No. 12/833,189, dated Feb. 17, 2011.
PCT International Search Report and Written Opinion for International Application No. PCT/GB2010/000485 dated May 21, 2010.
USPTO Office Action from U.S. Appl. No. 12/426,645 dated May 5, 2010,
USPTO Office Action from U.S. Appl. No. 12/472,561 dated May 5, 2010.
PCT International Searching Authority for International Application No. PCT/GB2009/002596, dated 2010.
"A comparative study on the pozzolanic activity between nano-SiO2 and silica fume" Ye et al., Journal of Wuhan University of Technology, 2006, 21(3), 153-157, abstract only.
USPTO Notice of Allowance for U.S. Appl. No. 12/426,393, dated Dec. 16, 2010.
International Search Report for PCT/GB/2010/001045, dated Jul. 21, 2010.
Written Opinion of the International Searching Authority for PCT/GB/2010/001045, dated Jul. 21, 2010.
Final Office Action from USPTO for U.S. Appl. No. 12/833,189, dated Nov. 10, 2010.
Office Action from USPTO for U.S. Appl. No. 12/833,189, dated Oct. 1, 2010.
Final Office Action from USPTO for U.S. Appl. No. 11/388,645, dated Aug. 17, 2010.
"Effect of Nano-SiO2 on heat of hydration of portland cement,"Xu et al., Janjing Gongye Daxue Xuebao, Ziran Kexeuban (2007), 29)4), 45-48, abstract only.
"Application of nanometer silica in inorganic nonmetallic materials," Deng et al, Taoci (Xiangyang China) 2007, (9), 8-12, abstract only.
"Reaction mechanism analyses of cement based composite materials modified by nanoOsilica," Xu et al., Kyangye Gongcheng (Changsha, China), 2007, 27(3), 99-102, abstract only.
Research on Reinforcement of cement composites and relevant mechanism,: Yu et al, Qiangdoa Keji Daxue Xuebao Ziran Kexueban (2006), 27(2), 148-151, abstract only.
"Antagonistic Effect of superplasticizer and colloidal nanosilica in the hydration of Alite and Belite pastes," Bjoernstrom et al., Journal of Materials Science, 2007, 42(11), 3901-3907, abstract only.
"Nano-concrete: possibilities and challenges," Balaguru et al., RILEM Proceedings (2005), PRO 45 ($2^{nd}$ Int'l Symposium on Nanotechnology in construction (NICOM2), 2005, 233-243, abstract only.
"Optimization of silica fume, fly ash and amorphous nano-silica in superplasticized high performance concrete," Collepardi et al., American Concrete Instiution, SP 2004, SP-221 (Eight CANMET/ACI International Conference on Fly Ash, Silica Fume, Slag, and Natural Pozzolans n Concrete, 2004), 495-505, abstract only.
"Accelerating effects of colloidal nano-silica for beleficial calcium-silicate-hydrate formation in cement," Bjornstrom et al., Chemical Physis Letters (2003), 293 (1-3), 242-248.
"Experimental stdy on cement-based composites with nanoSiO2," Feng er al., Cailao Kexue Yu Gongcheng Zuebao Bianjibu (2004), 22(2), 224-227.

(56) References Cited

OTHER PUBLICATIONS

"Strong and bioactive composites containing nano-silica-fused whiskers for bone repaid," Xu et al., Biomaterials (2004), 25(19), 4615-4626.
Research on properties of Portland cement added with nano-SiO2, Wang et al., RILEM Proceedings (2003), PRO 32 (International Conference on Advances in Concrete and Structures, 2003, vol. 1), 154-161, abstract only.
"Comparison on properties of high strength concrete with nano-SiO2 and silica fume added," Ye et al., Jianzhu Cailiao Xuebao (2003), 6(4), 381-385, abstract only.
"Study on compound effect of silica fume and nano-SiOx for cementing composite materials," Tang et al., Guisuanyan Xuebao (2003), 3(5), 523-527, abstract only.
"Effect of nano-SiOx and silica fume on cement paste water demand," Li et al., Shenyang Jianzhu gongcheng Xueyuan Xuebao, Ziran Kexueban (2002), 18(4), 278-281, abstract only.
"Hydration reaction between C3S and fly ash, silica fume, nano-SiO2, and microstructure of hydrated pastes," Ba et al., Guisuanyan Xuebao (2002), 30(6), 780-784, abstract only.
"Nano-silica—an additive for high-strength concrete," Wagner et al., Wissenschaftliche Zeitschrift—Hoschule fuer Architektur and Bauwesen Weimar—Universitaet (1994), 40 (5/6/7), 183-87, abstract only.
"Investigations on the preparation and mechanical properties of the nano-alumina reinforced cement composite," Li et al., Materials Letters (2006), 0(3), 356-359, abstract only.
"Effect of secondary interface microstructure on pore structure and performance of cement-based materials," Feng et al., Cailiao Yanjiu Xuebao (2003), 17(5), 489-494, abstract only.
"Preparation of multifunctional dry-power paints," Yanmin Gao, Faming Zhuanli Shenqing gongkai Shuomingshu, 4 pages, 2005, abstract only.
USPTO office action from U.S. Appl. No. 12/426,393, dated Jul. 2, 2010.
USPTO notice of allowance from U.S. Appl. No. 12/472,561, dated Jun. 29, 2010.
USPTO Office Action for U.S. Appl. No. 12/567,783 dated Jan. 16, 2015.
USPTO Office Action for U.S. Appl. No. 12/567,783 dated Oct. 3, 2015.
USPTO Office Action for U.S. Appl. No. 12/567,783 dated Apr. 6, 2011.
USPTO Final Office Action for U.S. Appl. No. 12/567,783 dated Jul. 30, 2015.
USPTO Final Office Action for U.S. Appl. No. 12/567,783 dated May 5, 2014.
USPTO Final Office Action for U.S. Appl. No. 12/567,783 dated Aug. 23, 2011.
USPTO Notice of Allowance for U.S. Appl. No. 12/567,783 dated Oct. 2, 2015.
USPTO Final Office Action for U.S. Appl. No. 12/651,662 dated Feb. 13, 2013.
USPTO Final Office Action for U.S. Appl. No. 12/833,189 dated Oct. 11, 2011, 2013

\* cited by examiner

SEALANT COMPOSITIONS AND METHODS UTILIZING NANO-PARTICLES

CROSS-REFERENCE TO RELATED APPLICATIONS

The present application is a divisional of U.S. patent application Ser. No. 12/567,783, filed Sep. 27, 2009, entitled "Sealant Compositions and Methods Utilizing Nano-Particles," which is a continuation-in-part of U.S. patent application Ser. No. 12/263,954, filed Nov. 3, 2008, entitled "Cement Compositions and Methods Utilizing Nano-Hydraulic Cement," which is a continuation-in-part of U.S. patent application Ser. No. 11/747,002, now U.S. Pat. No. 7,559,369, filed on May 10, 2007, entitled "Well Treatment Compositions and Methods Utilizing Nano-Particles." The entire disclosures of these applications are incorporated herein by reference.

BACKGROUND

The present invention relates to well treatment fluids and methods utilizing nano-particles and, in certain embodiments, to sealant compositions and methods utilizing nano-particles.

A variety of different sealant compositions may be used in subterranean operations. For example, in subterranean well construction, a pipe string (e.g., casing and liners) may be run into a well bore and cemented in place using a cement composition. The process of cementing the pipe string in place is commonly referred to as "primary cementing." In a typical primary cementing method, a cement composition may be pumped into an annulus between the walls of the well bore and the exterior surface of the pipe string disposed therein. The cement composition sets in the annular space, thereby forming an annular sheath of hardened, substantially impermeable cement that supports and positions the pipe string in the well bore and bonds the exterior surface of the pipe string to the subterranean formation. Among other things, the annular sheath of set cement surrounding the pipe string should seal the annulus, preventing the migration of fluids in the annulus, as well as protecting the pipe string from corrosion. Cement compositions also may be used in remedial cementing methods, such as squeeze cementing, repairing casing strings and the placement of cement plugs. In squeeze cementing, for example, a cement composition may be used to plug off and seal undesirable flow passages in a cement sheath, casing, and/or gravel packs. In some instances, cement compositions may be used to change the direction of the well bore, for example, by drilling a pilot hole in a hardened mass of cement, commonly referred to as a "kickoff plug," placed in the well bore. While a cement composition is one type of sealant composition that may be used in subterranean operations, other non-cement containing cement sealant compositions also may be employed. By way of example, polymeric sealant compositions also may be used.

SUMMARY

The present invention relates to well treatment fluids and methods utilizing nano-particles and, in certain embodiments, to sealant compositions and methods utilizing nano-particles.

An embodiment of the present invention includes a method comprising introducing a sealant composition comprising nano-particles and water into a subterranean formation. The nano-particles may comprise at least about 75% by weight of dry particles in the sealant composition.

Another embodiment of the present invention includes a method comprising preparing a sealant composition comprising nano-particles and water. The nano-particles may comprise at least about 20% by weight of dry particles in the sealant composition. At least a portion of the nano-particles may be introduced into the sealant composition in a liquid suspension.

Another embodiment of the present invention includes a method comprising including agglomerated nano-particles in a sealant composition. The method further may comprise introducing the sealant composition into a subterranean formation.

Another embodiment of the present invention includes a method comprising introducing a sealant composition comprising nano-particles, water, and an elastomeric particle into a subterranean formation.

Another embodiment of the present invention includes a method comprising introducing a sealant composition comprising nano-particles, water, and a swellable particle into a subterranean formation.

Yet another embodiment of the present invention includes a sealant composition comprising nano-particles and water. The nano-particles may comprise at least 75% by weight of dry particles in the sealant composition.

The features and advantages of the present invention will be apparent to those skilled in the art upon reading the following description of specific embodiments.

DESCRIPTION OF SPECIFIC EMBODIMENTS

The present invention relates to well treatment fluids and methods utilizing nano-particles and, in certain embodiments, to sealant compositions and methods utilizing nano-particles. As used herein, the term "sealant composition(s)" refers to a composition(s) that hydraulically sets or otherwise develops compressive strength suitable for use in a subterranean formation application.

An embodiment of the sealant compositions of the present invention may comprise nano-particles and water. Generally, the term "nano-particle" may be defined as a particle having a mean particle size of about 1 nanometers ("nm") to about 100 nm (e.g., about 5 nm, about 10, about 20 nm, about 30 nm, about 40 nm, about 50 nm, about 60 nm, about 70 nm, about 80 nm, about 90 nm, etc.). In accordance with embodiments of the present invention, the nano-particles may be included in the sealant compositions in a number of different forms, including, for example, as discrete nano-particles, encapsulated nano-particles, agglomerated nano-particles, or in a liquid suspension. In certain embodiments, the nano-particles may comprise at least about 1% by weight of the dry particles in the sealant composition. The term "dry particles" refers to the nano-particles and other solid particles that are present in a dry form at some point either prior to or during introduction into the sealant composition. In certain instances, the dry particles may be suspended in a liquid medium prior to introduction in the sealant composition.

One of the many potential advantages of using nano-particles in embodiments of the sealant compositions is that the inclusion of nano-particles can provide sealant compositions having improved mechanical properties after setting. For example, embodiments of the sealant compositions may have improved compressive strength, tensile strength, Young's modulus and Poisson's ratio. In addition, nano-particles (e.g., nano-silica) also may be included in sealant compositions as a set accelerator to accelerate the set time of the sealant composition. Among other advantages of using nano-particles is that since nano-particles are small, the nano-particles should be capable of invading narrow opening that standard cements may not be able to access. Accordingly, sealant compositions comprising nano-particles may be suitable for use, for example, in squeeze operations. For example, embodiments of the sealant compositions may be seal voids in a pipe string, cement sheath, or gravel pack. As used herein, the term "void" refers to any type of space, including fractures, holes, cracks, spaces, channels, and the like. It is believed that the nano-particles should be able to penetrate voids that are not repairable with larger-sized cements.

Examples of suitable nano-particles may include nano-hydraulic cements, nano-silicas, nano-clays, nano-alumina, nano-zinc oxide, nano-boron, nano-iron oxide and combinations thereof. Nano-hydraulic cements have a variety of applications for well cementing, including both primary and remedial cementing operations. A suitable nano-hydraulic cement and technique that may be used to measure particle size, in accordance with embodiments of the present invention, is described by S C Halim, T J Brunner, R N Grass, M Bohner and W J Stark, *Preparation of an Ultra Fast Binding Cement from Calcium Silicate-Based Mixed Oxide Nanoparticles*, NANOTECHNOLOGY 18 (2007) 395701 (6pp). Among other advantages of using nano-hydraulic cement is that it should provide a sealant composition with a lower density and reduced set time. It is believed that the reduced set time of the nano-hydraulic cement may be from early reactivity.

Generally, any hydraulic cement suitable for use in subterranean operations and sized to a range of about 1 nm to about 100 nm may be suitable for use as a nano-hydraulic cement in embodiments in the present invention. Suitable cements that may, for example, be ground to nano-hydraulic cements include those classified as Classes A through H according to American Petroleum Institute, *API Specification for Materials and Testing for Well Cements*, API Specification 10, Fifth Ed., Jul. 1, 1990. In certain embodiments, API Class A, C, G and H hydraulic cements may be preferred. In addition, in some embodiments, other cements that may be suitable for grinding to nano-hydraulic cements suitable for use in the present invention may be classified as ASTM Type I, II, or III. A variety of nano-hydraulic cements are suitable for use, including those comprised of calcium, aluminum, silicon, oxygen, and/or sulfur, which set and harden by reaction with water. Such nano-hydraulic cements include, but are not limited to, Portland cements, pozzolanic cements, gypsum cements, soil cements, calcium phosphate cements, high-alumina content cements, silica cements, high-alkalinity cements, or mixtures thereof.

The nano-hydraulic cement may be present in embodiments of the sealant compositions of the present invention in an amount of from about 0.01% to 100% by weight of cementitious material. As used herein, the term "cementitious material" refers to nano-hydraulic cement, hydraulic cement, cement kiln dust, and the like, which set and harden by reaction with water. In some embodiments, the nano-hydraulic cement may be present in the sealant compositions of the present invention in an amount of about 1% to 75% by weight of cementitious material (e.g., about 5%, about 10%, about 20%, about 30%, about 40%, about 50%, about 60%, about 70%, etc.). In some embodiments, the nano-hydraulic cement may be present in the sealant compositions of the present invention in an amount of about 1% to about 50% by weight of cementitious material. In some embodiments, the nano-hydraulic cement may be present in the sealant compositions of the present invention in an amount of about 1% to about 25% by weight of cementitious material.

Another example of a suitable nano-particle that may be included in embodiments of the sealant compositions of the present invention includes nano-silica. It is now recognized that the nano-silica utilized with present embodiments, which may include silicon dioxide, may have an impact on certain physical characteristics of sealant compositions after setting. For example, relative to inclusion of colloidal silica or larger silica particles in a sealant composition, inclusion of particulate nano-silica in the sealant composition may provide improved mechanical properties, such as compressive strength, tensile strength, Young's modulus and Poisson's ratio. In addition, particulate nano-silica also may be included in the sealant composition as a set accelerator to accelerate the set time of the sealant composition. Accordingly, a sealant composition in accordance with present embodiments may comprise a sufficient amount of nano-silica to provide the desired characteristics. In certain embodiments, the nano-silica may be present in the sealant compositions in an amount in the range of from about 1% to about 25% by weight of cementitious materials (e.g., about 2%, about 5%, about 10%, about 15%, about 20%, etc.). In certain embodiments, the nano-silica may be present in the sealant compositions in an amount in the range of from about 5% to about 15% by weight of cementitious materials.

The nano-silica may, for example, be described as particulate nano-silica. That is, the nano-silica may be particulate in nature and not, for example, a colloidal silica or a suspension of silica in solution. Indeed, in one embodiment, the particulate nano-silica may be added to the sealant composition as a dry nano-silica powder. However, colloidal nano-silica also may be suitable for use in embodiments of the present invention. In certain embodiments, the nano-silica may have a mean particle size of less than about 100 nm, for example, in the range of from about 1 nm to about 100 nm. In further embodiments, the nano-silica may have a mean particle size of less than about 50 nm, for example in the range of from about 5 nm to about 50 nm. In further embodiments, the nano-silica may have a particle size of less than or equal to about 30 nm, for example, in the range of from about 5 nm to about 30 nm. However, it should be noted that the nano-silica may be utilized in combination with larger sized silica particles in accordance with present embodiments.

Another example of a suitable nano-particle that may be included in embodiments of the sealant compositions of the present invention includes nano-clay. An example of a suitable nano-clay includes nano-bentonite. In one particular embodiment, the nano-clay may comprise nano-montmorillonite. Nano-montmorillonite is member of the smectite-clay family, and belongs to the general mineral group of clays with a sheet-like structure where the dimensions in two directions far exceed its thickness. Generally, the nano-montmorillonite has of a three-layered structure of aluminum sandwiched between two layers of silicon, similar to the mica-type layered silicates. Montmorillonite is an active and major ingredient in a volcanic ash called bentonite, which has an ability to swell to many times its original weight and volume when it absorbs water. One example of a suitable nano-montmorillonite is NANOMER® nanoclay, which is available from Nanocor, Arlington Heights, Ill.

It is now recognized that the nano-clay utilized with present embodiments may have an impact on certain physical characteristics of sealant compositions after setting. For example, relative to inclusion of larger clay particles in a sealant composition, inclusion of nano-clay in particular sealant compositions may provide improved mechanical properties. In addition, the nano-clay also may be included in embodiments of the sealant composition to reduce the permeability of the resultant set cement, thus potentially reducing the susceptibility of the set cement to problems associated with gas migration or corrosive environments such as those created by $CO_2$. For example, a sealant composition may be designed to have reduced permeability after setting by including nano-clay in the sealant composition. Accordingly, a sealant composition in accordance with present embodiments may comprise a sufficient amount of nano-clay to provide the desired characteristics. By way of example, the nano-clay may be present in the sealant compositions in an amount in the range of from about 0.1% to about 25% by weight of cementitious components (e.g., about 0.5%, about 1%, about 5%, about 10%, about 15%, about 20%, etc.). In certain embodiments, the nano-clay may be present in the sealant compositions in an amount in the range of from about 2% to about 10% by weight of cementitious components.

The nano-clay may be configured in any of a variety of different shapes in accordance with embodiments of the present invention. Examples of suitable shapes include nano-clay in the general shape of platelets, shavings, flakes, rods, strips, spheroids, toroids, pellets, tablets, or any other suitable shape. In certain embodiments, the nano-clay may generally have a plate-type structure. Suitable plate-type nano-clays include nano-montmorillonite. Plate-type nano-clay may have a thickness, in certain embodiments of less than about 10 nm and, alternatively, of less than about 2 nm. In certain embodiments, the plate-type nano-clay may have a thickness of about 1 nm. Embodiments of the plate-type nano-clay may have surface dimensions (length and/or width) of about 1 nm to about 600 nm. In certain embodiments, the plate-type nano-clay may have surface dimensions about 300 nm to about 600 nm. It should be understood that plate-type nano-clay having dimensions outside the specific ranges listed in this disclosure are encompassed by the present invention.

As previously mentioned, the nano-particles may comprise at least about 1% by weight of the dry particles (e.g., about 10%, about 25%, about 50%, about 75%, about 80%, about 90%, about 99% etc.), that were included in the sealant composition. By way of example, the nano-particles may be comprise about 10% to about 100% by weight of the dry particles that were included in the sealant composition. By way of further example, the nano-particles may comprise about 50% about 100% by weight of the dry particles that were included in the sealant composition. It should be understood that the reference to dry particles generally refers to a variety of different additives that may typically be included in a sealant composition in a solid form. Examples of such additives include, but are not limited to, hydraulic cement, cement kiln dust, amorphous silica, crystalline silica, vitrified shale, lost circulation materials, and the like. It should be not be implied from the term "dry particle" that the nano-particles or other dry particles (or solid particles) are dry when introduced into the sealant composition. In certain embodiments, the dry particles may be suspended in a liquid medium prior to introduction in the sealant composition.

The water used in certain embodiments of the sealant compositions of the present invention may be freshwater or saltwater (e.g., water containing one or more salts dissolved therein, seawater, brines, saturated saltwater, etc.). In general, the water may be present in an amount sufficient to form a pumpable slurry. In certain embodiments, the water may be present in the sealant compositions in an amount in the range of about 33% to about 200% by weight of cementitious materials. In certain embodiments, the water may be present in an amount in the range of about 35% to about 70% by weight of cementitious materials.

Embodiments of the sealant compositions of the present invention may further comprise a hydraulic cement that has a mean particle size of greater than about 1 micron. Generally, any of a variety of cements suitable for use in subterranean cementing operations may be used in accordance with embodiments of the present invention. Suitable examples include hydraulic cements that comprise calcium, aluminum, silicon, oxygen and/or sulfur, which set and harden by reaction with water. Such hydraulic cements, include, but are not limited to, Portland cements, pozzolana cements, gypsum cements, high-alumina-content cements, slag cements, and combinations thereof. In certain embodiments, the hydraulic cement may comprise a Portland cement. Portland cements that may be suited for use in embodiments of the present invention may be classified as Class A, C, H and G cements according to American Petroleum Institute, API Specification for Materials and Testing for Well Cements, API Specification 10, Fifth Ed., Jul. 1, 1990. In addition, in some embodiments, hydraulic cements suitable for use in the present invention may be classified as ASTM Type I, II, or III.

Where present, the larger hydraulic cement generally may be included in embodiments of the sealant compositions in an amount sufficient to provide the desired compressive strength, density, and/or cost. In some embodiments, the larger hydraulic cement may be present in the sealant compositions of the present invention in an amount of about 0.1% to about 99% by weight of cementitious materials. In some embodiments, the hydraulic cement may be present in the sealant compositions of the present invention in an amount of about 0.1% to about 75% by weight of cementitious materials. In some embodiments, the hydraulic cement may be present in the sealant compositions of the present invention in an amount of about 0.1% to about 50% by weight by weight of cementitious materials. In some embodiments, the hydraulic cement may be present in the sealant compositions of the present invention in an amount in the range of from about 0.1% to about 25% by weight of cementitious materials.

In certain embodiments of the present invention, a sealant composition described herein may be foamed using a gas and a foaming and stabilizing surfactant. The gas utilized in the foamed sealant compositions of the present invention may be any gas suitable for foaming a sealant composition, including, but not limited to, air or nitrogen, or combinations thereof. Generally, the gas should be present in the foamed sealant compositions of the present invention in an amount sufficient to form a suitable foam. In certain embodiments, the gas may be present in an amount in the range of from about 10% and about 80% by volume of the composition.

Any suitable foaming and stabilizing surfactant may be used in the foamed sealant composition of the present invention. Among other things, the foaming and stabilizing surfactants may facilitate the foaming of a sealant composition and/or also stabilize the resultant foamed sealant composition formed therewith. Suitable foaming and stabilizing surfactants may include, but are not limited to: mixtures of an ammonium salt of an alkyl ether sulfate, a cocoamidopropyl betaine surfactant, a cocoamidopropyl dimethylamine oxide surfactant, sodium chloride, and water; mixtures of an ammonium salt of an alkyl ether sulfate surfactant, a cocoamidopropyl hydroxysultaine surfactant, a cocoamidopropyl dimethylamine oxide surfactant, sodium chloride, and water; hydrolyzed keratin; mixtures of an ethoxylated alcohol ether sulfate surfactant, an alkyl or alkene amidopropyl betaine surfactant, and an alkyl or alkene dimethylamine oxide surfactant; aqueous solutions of an alpha-olefinic sulfonate surfactant and a betaine surfactant; and combinations thereof. An example of a suitable hydrolyzed keratin is described in U.S. Pat. No. 6,547,871, the disclosure of which is incorporated herein by reference. Example of suitable mixtures of an ethoxylated alcohol ether sulfate surfactant, an alkyl or alkene amidopropyl betaine surfactant, and an alkyl or alkene dimethylamine oxide surfactant is described in U.S. Pat. No. 6,063,738, the disclosure of which is incorporated herein by reference. Examples of suitable aqueous solutions of an alpha-olefinic sulfonate surfactant and a betaine surfactant are described in U.S. Pat. No. 5,897,699, the disclosure of which is incorporated herein by reference. In one embodiment, the foaming and stabilizing surfactant comprises a mixture of an ammonium salt of an alkyl ether sulfate, a cocoamidopropyl betaine surfactant, a cocoamidopropyl dimethylamine oxide surfactant, sodium chloride, and water.

Where used, the foaming and stabilizing surfactants may be present in embodiments of the foamed sealant compositions of the present invention in an amount sufficient to provide a suitable foam. In some embodiments, the foaming and stabilizing surfactant may be present in an amount in the range of from about 0.8% and about 5% by volume of the water present in the foamed sealant composition.

Embodiments of the sealant compositions of the present invention may also comprise swellable particles. As used herein, a particle is characterized as swelling when it swells upon contact with oil and/or an aqueous fluid (e.g., water). Swellable particles suitable for use in embodiments of the present invention may generally swell by up to about 50% of their original size at the surface. Under downhole conditions, this swelling may be more, or less, depending on the conditions presented. For example, the swelling may be at least 10% at downhole conditions. In some embodiments, the swelling may be up to about 50% under downhole conditions. However, as those of ordinary skill in the art, with the benefit of this disclosure, will appreciate, the actual swelling when the swellable particles are included in a sealant composition may depend on, for example, the concentration of the swellable particles included in the sealant composition. In accordance with embodiments of the present invention, the swellable particles may be included in the sealant composition, for example, to counteract the formation of cracks in the cement sheath and/or micro-annulus between the cement sheath and the pipe string or the formation. In general, the swellable particles should be capable of swelling when contacted by aqueous fluids and/or oil to inhibit fluid flow through the crack and/or micro-annulus. Accordingly, the swellable particles may prevent and/or reduce the loss of zonal isolation in spite of the formation of cracks and/or micro-annulus, potentially resulting in an improved annular seal for the sealant compositions.

An example of swellable particles that may be utilized in embodiments of the present invention comprises a swellable elastomer. Some specific examples of suitable swellable elastomers include, but are not limited to, natural rubber, acrylate butadiene rubber, polyacrylate rubber, isoprene rubber, choloroprene rubber, butyl rubber (IIR), brominated butyl rubber (BIIR), chlorinated butyl rubber (CIIR), chlorinated polyethylene (CM/CPE), neoprene rubber (CR), styrene butadiene copolymer rubber (SBR), sulphonated polyethylene (CSM), ethylene acrylate rubber (EAM/AEM), epichlorohydrin ethylene oxide copolymer (CO, ECO), ethylene-propylene rubber (EPM and EDPM), ethylene-propylene-diene terpolymer rubber (EPT), ethylene vinyl acetate copolymer, fluorosilicone rubbers (FVMQ), silicone rubbers (VMQ), poly 2,2,1-bicyclo heptene (polynorborneane), and alkylstyrene. One example of a suitable swellable elastomer comprises a block copolymer of a styrene butadiene rubber. Examples of suitable elastomers that swell when in contact with oil include, but are not limited to, nitrile rubber (NBR), hydrogenated nitrile rubber (HNBR, HNS), fluoro rubbers (FKM), perfluoro rubbers (FFKM), tetrafluorethylene/propylene (TFE/P), isobutylene maleic anhydride. Combinations of suitable swellable elastomers also may be used. Other swellable elastomers that behave in a similar fashion with respect to oil or aqueous fluids also may be suitable. Those of ordinary skill in the art, with the benefit of this disclosure, will be able to select an appropriate swellable elastomer for use in embodiments of the sealant compositions of the present invention based on a variety of factors, including the application in which the composition will be used and the desired swelling characteristics.

An example of swellable particles that may be utilized in embodiments of the present invention comprises a water-swellable polymer. Some specific examples of suitable water-swellable polymers, include, but are not limited to starch-polyacrylate acid graft copolymer and salts thereof, polyethylene oxide polymer, carboxymethyl cellulose type polymers, polyacrylamide, poly(acrylic acid) and salts thereof, poly(acrylic acid-co-acrylamide) and salts thereof, graft-poly(ethylene oxide) of poly(acrylic acid) and salts thereof, poly(2-hydroxyethyl methacrylate), and poly(2-hydroxypropyl methacrylate). Combinations of suitable water-swellable polymers also may be used. In certain embodiments, the water-swellable polymers may be crosslinked and/or lightly crosslinked. Other water-swellable polymers that behave in a similar fashion with respect to aqueous fluids also may be suitable. Those of ordinary skill in the art, with the benefit of this disclosure, will be able to select appropriate water-swellable polymers for use in embodiments of the sealant compositions of the present invention based on a variety of factors, including the application in which the composition will be used and the desired swelling characteristics.

Where used, the swellable particles generally may be included in the sealant compositions in an amount sufficient to provide the desired mechanical properties. In some embodiments, the swellable particles may be present in the sealant compositions in an amount up to about 25% by weight of the cementitious component. In some embodiments, the swellable particles may be present in the sealant compositions in a range of about 5% to about 25% by weight of the cementitious component. In some embodiments, the swellable particles may be present in the sealant compositions in a range of about 15% to about 20% by weight of the cementitious component.

In addition, the swellable particles that are utilized may have a wide variety of shapes and sizes of individual particles suitable for use in accordance with embodiments of the present invention. By way of example, the swellable particles may have a well-defined physical shape as well as an irregular geometry, including the physical shape of platelets, shavings, fibers, flakes, ribbons, rods, strips, spheroids, beads, pellets, tablets, or any other physical shape. In some embodiments, the swellable particles may have a particle size in the range of about 5 microns to about 1,500 microns.

In some embodiments, the swellable particles may have a particle size in the range of about 20 microns to about 500 microns. However, particle sizes outside these defined ranges also may be suitable for particular applications.

Other additives suitable for use in subterranean cementing operations also may be added to embodiments of the sealant compositions, in accordance with embodiments of the present invention. Examples of such additives include, but are not limited to, strength-retrogression additives, set accelerators, set retarders, weighting agents, lightweight additives, gas-generating additives, mechanical property enhancing additives, lost-circulation materials, filtration-control additives, dispersants, a fluid loss control additive, defoaming agents, foaming agents, thixotropic additives, and combinations thereof. Specific examples of these, and other, additives include crystalline silica, amorphous silica, fumed silica, salts, fibers, hydratable clays, calcined shale, vitrified shale, microspheres, fly ash, slag, diatomaceous earth, metakaolin, rice husk ash, natural pozzolan (e.g., pumicite), zeolite, cement kiln dust, lime, elastomers, elastomeric particles, resins, latex, combinations thereof, and the like. One example of a suitable elastomeric particle comprises a block copolymer of a styrene butadiene rubber as set forth in U.S. Pat. No. 6,832,651, the disclosure of which is incorporated herein by reference. A person having ordinary skill in the art, with the benefit of this disclosure, will readily be able to determine the type and amount of additive useful for a particular application and desired result.

Embodiments of the sealant compositions of the present invention may have a density suitable for a particular application. By way of example, the sealant compositions may have a density in the range of from about 4 pounds per gallon ("ppg") to about 20 ppg. In certain embodiments, the sealant compositions may have a density in the range of from about 8 ppg to about 17 ppg. Embodiments of the sealant compositions may be foamed or unfoamed or may comprise other means to reduce their densities, such as hollow microspheres, low-density elastic beads, or other density-reducing additives known in the art. Those of ordinary skill in the art, with the benefit of this disclosure, will recognize the appropriate density for a particular application.

As will be appreciated by those of ordinary skill in the art, certain embodiments of the sealant compositions of the present invention may be used for forming a seal in a variety of subterranean applications. In certain embodiments, a sealant composition may be introduced into a subterranean formation and allowed to form a seal therein. In certain embodiments, the sealant composition may comprise a cement composition that sets in the subterranean formation to form the seal. By way of example, in certain primary cementing embodiments, a sealant composition may be introduced into a space between a subterranean formation and a pipe string located in the subterranean formation. The sealant composition may be allowed to set to form a hardened mass in the space between the subterranean formation and the pipe string. Embodiments of the present invention further may comprise running the pipe string into a well bore penetrating the subterranean formation. In addition, in certain remedial cementing embodiments, a sealant composition may be used, for example, in squeeze-cementing operations or in the placement of cement plugs. For example, embodiments of the sealant compositions may be used to: penetrate a gravel pack to shut off water or gas production, penetrate a gravel pack to divert steam injections, and penetrate a gravel pack to plug and abandon a well. One or more hydrocarbons (e.g., oil, gas, etc.) may be produced from a well bore penetrating the subterranean formation in accordance with embodiments of the present invention.

In addition to incorporation of the nano-particles in a dry free-flowing state, embodiments of the present invention may include incorporating the nano-particles in an agglomerated form. Among other things, use of agglomerated nano-particles should facilitate the use of nano-particles in subterranean applications, for example, by alleviating potential handling problems. In general, agglomerated nano-particles may include discrete nano-particles that have been collected to form a cohesive mass. Any of a variety of different techniques may be used to agglomerate the nano-particles for use in embodiments of the present invention. In certain embodiments, agglomerated nano-particles may comprise nano-particles bound together by a water-soluble binder. By way of example, agglomerated nano-particles may be prepared by depositing the water-soluble binder onto the nano-particles such that the binder holds the nano-particles together. Agglomerated nano-particles also may include nano-particles that have been pelletized. Generally, the nano-particles may be formed into pellets of any desired shape and/or size by any suitable technique, including, but not limited to, compression, extrusion, and casting. Example methods of agglomeration are set forth in U.S. Pat. Nos. 5,454,867; 6,500,253; 6,861,392; and 7,156,174, the disclosures of which are incorporated herein by reference.

Agglomeration of the nano-particles generally may aid with mixing and bulk transfer of nano-particles. However, when the agglomerated nano-particles are contacted with water, the agglomerated nano-particle should disperse into discrete nano-particles in accordance with embodiments of the present invention. For example, the agglomerated nano-particles may be designed to immediately disperse into discrete nano-particles when mixed with water. By way of further example, the agglomerated nano-particles may be designed to disperse after a chosen delay period. In certain embodiments, a degradable material may be incorporated into the agglomerated nano-particles, for example, to facilitate delayed release of the nano-particles. Examples of suitable degradable materials include, but are not limited to, a dextran, a cellulose, a chitin, a chitosan, a liquid ester (e.g., triethyl citrate), a protein (e.g., gelatin), an aliphatic polyester (e.g., polylactic acid), a poly(glycolide), a poly(e-caprolactone), a poly (hydroxybutyrate), a poly(anhydride), an aliphatic polycarbonate, an ortho ester, a poly(orthoester), a poly(amino acid), a poly (ethylene oxide), a polyphosphazene, and combinations thereof.

Another technique for alleviated potential handling problems associated with incorporation of the nano-particles in a dry free-flowing state may include incorporating nano-particles a liquid suspension (e.g., colloid suspension). For example, the nano-particles dispersed in a continuous liquid phase may be incorporated into embodiments of the sealant compositions. Suspension of the nano-particles in a liquid medium generally may aid with mixing and bulk transfer of nano-particles, but the nano-particles should release from the suspension when mixed with the sealant composition in accordance with present embodiments.

Contained nano-particles also may be used in certain embodiments of the present invention. Specifically, containment of the nano-particles in accordance with embodiments of the present invention may include enclosing the nano-particles within an outer coating or container in particulate form. Certain methods of encapsulation are set forth in U.S. Pat. Nos. 5,373,901; 6,444,316; 6,527,051; 6,554,071; 7,156,174; and 7,204,312, the disclosures of which are incorporated herein by reference.

Various types of containment may be employed, in certain embodiments, such that the nano-particles (e.g., the nano-hydraulic cement) are contained but retain their particulate nature and, thus, retain their corresponding impact on physical properties of sealant composition. For example, the nano-particles may be contained within a bag, capsule, layer, coating or the like. Further, the material utilized to contain the nano-particles may be selected to facilitate transportation and/or incorporation of the nano-particles into a sealant composition. For example, to facilitate handling of the nano-particles and/or to facilitate timed release of the nano-particles, the containment material may be degradable. This may facilitate handling of the nano-particles by allowing inclusion of the contained nano-particles in a sealant composition without requiring that the nano-particles first be removed from the containment material. Further, the containing material may be designed to degrade at a certain rate when in contact with certain materials (e.g., water) so that the nano-particles are released into the sealant composition at a desired time. Certain water-dissolvable materials that may be utilized to encapsulate the nano-particles are described in U.S. Pat. Nos. 4,961,790 and 5,783,541, the disclosures of which are incorporated herein by reference.

In accordance with certain embodiments, the sealant compositions of the present invention may utilize a packing volume fraction suitable for a particular application as desired. As used herein, the term "packing volume fraction" refers to the volume of the particulate materials in a fluid divided by the total volume of the fluid. The size ranges of the preferred particulate materials are selected, as well as their respective proportions, in order to provide a maximized packing volume fraction so that the fluid is in a hindered settling state. It is known that, in such a state, the particulate materials behave "collectively" like a porous solid material. The hindered settling state is believed to correspond, in practice, to a much higher solid material concentration in the fluid than that present in the some traditional sealant compositions. Packing volume fraction is described in further detail in U.S. Pat. No. 7,213,646, the disclosure of which is incorporated herein by reference.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. While compositions and methods are described in terms of "comprising," "containing," "having," or "including" various components or steps, the compositions and methods can also "consist essentially of" or "consist of" the various components and steps. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee.

What is claimed is:

1. A sealant composition comprising:
nano-particles comprising nano-hydraulic cement and additional nano-particles selected from the group consisting of nano-silica, nano-clay, nano-alumina, nano-zinc oxide, nano-boron, nano-iron oxide, and any combination thereof, and
water in an amount of about 33% to about 200% by weight of cementitious materials present in the sealant composition,
wherein the nano-particles comprise at least 75% by weight of dry particles in the sealant composition, and wherein no additional dry particles other than the dry particles were included in the sealant composition.

2. The sealant composition of claim 1 wherein the nano-particles comprise at least about 90% by weight of the dry particles in the sealant composition.

3. The sealant composition of claim 1 wherein the sealant composition further comprises at least one additive selected from the group consisting of a strength-retrogression additive, a set accelerator, a set retarder, a weighting agent, a lightweight additive, a gas-generating additive, a mechanical property enhancing additive, a lost-circulation material, a filtration-control additive, a dispersant, a fluid loss control additive, a defoaming agent, a foaming agent, a thixotropic additive, and any combination thereof.

4. The sealant composition of claim 1 wherein the sealant composition further comprises at least one additive selected from the group consisting of crystalline silica, amorphous silica, fumed silica, salt, fiber, hydratable clay, calcined shale, vitrified shale, a microsphere, fly ash, slag, diatomaceous earth, metakaolin, rice husk ash, natural pozzolan, pumicite, zeolite, cement kiln dust, lime, an elastomer, an elastomeric particle, resin, latex, a swellable particle, and any combination thereof.

5. The sealant composition of claim 1 wherein the sealant composition has a maximized packing volume fraction, wherein the maximized packing volume fraction uses particulate material including the nano-particles.

6. The sealant composition of claim 1 wherein at least a portion of the nano-particles are agglomerated nano-particles, wherein a degradable material is incorporated into the agglomerated nano-particles to facilitate delayed release of the portion nano-particles in the sealant composition.

7. A sealant composition comprising:
nano-particles comprising nano-hydraulic cement and additional nano-particles selected from the group consisting of nano-silica, nano-clay, nano-alumina, nano-zinc oxide, nano-boron, nano-iron oxide, and any combination thereof, and
water in an amount of about 33% to about 200% by weight of cementitious materials present in the sealant composition,
wherein the nano-particles comprise at least about 75% by weight of dry particles in the sealant composition, and wherein at least a portion of the nano-particles are introduced into the sealant composition in a liquid suspension, and wherein no additional dry particles other than the dry particles were included in the sealant composition.

8. The sealant composition of claim 7 wherein the nano-particles comprise at least about 90% by weight of the dry particles in the sealant composition.

9. The sealant composition of claim 7 wherein the sealant composition further comprises at least one additive selected from the group consisting of a strength-retrogression additive, a set accelerator, a set retarder, a weighting agent, a lightweight additive, a gas-generating additive, a mechanical property enhancing additive, a lost-circulation material, a filtration-control additive, a dispersant, a fluid loss control additive, a defoaming agent, a foaming agent, a thixotropic additive, and any combination thereof.

10. The sealant composition of claim 7 wherein the sealant composition further comprises at least one additive selected from the group consisting of crystalline silica, amorphous silica, fumed silica, salt, fiber, hydratable clay, calcined shale, vitrified shale, a microsphere, fly ash, slag, diatomaceous earth, metakaolin, rice husk ash, natural pozzolan, pumicite, zeolite, cement kiln dust, lime, an elastomer, an elastomeric particle, resin, latex, a swellable particle, and any combination thereof.

11. A sealant composition comprising:
agglomerated nano-particles wherein the agglomerated nano-particles comprise at least one degradable material selected from the group consisting of a dextran, a cellulose, a chitin, a chitosan, a liquid ester, a protein, an aliphatic polyester, a poly(glycolide), a poly(e-caprolactone), a poly (hydroxybutyrate), a poly(anhydride), an aliphatic polycarbonate, an ortho ester, a poly(orthoester), a poly(amino acid), a poly (ethylene oxide), a polyphosphazene, and any combination thereof, and
water.

12. The sealant composition of claim 11 wherein the agglomerated nano-particles comprise at least about 20% by weight of the dry particles in the sealant composition.

13. The sealant composition of claim 11 wherein the agglomerated nano-particles comprise at least about 50% by weight of the dry particles in the sealant composition.

14. The sealant composition of claim 11 wherein the agglomerated nano-particles comprise at least one nano-particle selected from the group consisting of a nano-hydraulic cement, a nano-silica, a nano-clay, a nano-alumina, a nano-zinc oxide, a nano-boron, a nano-iron oxide, and any combination thereof.

15. The sealant composition of claim 11 wherein the agglomerated nano-particles comprise nano-particles bound together by a water-soluble binder.

16. The sealant composition of claim 11 wherein the agglomerated nano-particles comprise pelletized nano-particles.

17. The sealant composition of claim 11 wherein the sealant composition further comprises at least one additive selected from the group consisting of a strength-retrogression additive, a set accelerator, a set retarder, a weighting agent, a lightweight additive, a gas-generating additive, a mechanical property enhancing additive, a lost-circulation material, a filtration-control additive, a dispersant, a fluid loss control additive, a defoaming agent, a foaming agent, a thixotropic additive, and any combination thereof.

18. The sealant composition of claim 11 wherein the sealant composition further comprises at least one additive selected from the group consisting of crystalline silica, amorphous silica, fumed silica, salt, fiber, hydratable clay, calcined shale, vitrified shale, a microsphere, fly ash, slag, diatomaceous earth, metakaolin, rice husk ash, natural pozzolan, pumicite, zeolite, cement kiln dust, lime, an elastomer, an elastomeric particle, resin, latex, a swellable particle, and any combination thereof.

19. The sealant composition of claim 11 wherein the nano-particles further comprise nano-hydraulic cement and additional nano-particles selected from the group consisting of nano-silica, nano-clay, nano-alumina, nano-zinc oxide, nano-boron, nano-iron oxide, and any combination thereof, wherein the water is present in an amount of about 33% to about 200% by weight of cementitious materials present in the sealant composition.

20. The sealant composition of claim 19 wherein the nano-particles comprise at least about 75% by weight of dry particles in the sealant composition, wherein at least a portion of the nano-particles are introduced into the sealant composition in a liquid suspension, and wherein no additional dry particles other than the dry particles were included in the sealant composition.

21. A sealant composition comprising:
nano-particles comprising nano-hydraulic cement and additional nano-particles selected from the group consisting of nano-silica, nano-clay, nano-alumina, nano-zinc oxide, nano-boron, nano-iron oxide, and any combination thereof, a
at least one particle selected from the group consisting of an elastomeric particle and a swellable particle, and
water in an amount of about 33% to about 200% by weight of cementitious materials present in the sealant composition,
wherein the nano-particles comprise at least about 75% by weight of dry particles in the sealant composition, wherein at least a portion of the nano-particles are introduced into the sealant composition in a liquid suspension, and wherein no additional dry particles other than the dry particles were included in the sealant composition.

22. The sealant composition of claim 21 wherein the nano-particles comprise at least one nano-particle selected from the group consisting of a nano-hydraulic cement, a nano-silica, a nano-clay, a nano-alumina, a nano-zinc oxide, a nano-boron, a nano-iron oxide, and any combination thereof.

23. The sealant composition of claim 21 wherein the elastomeric particle comprises a block copolymer of styrene butadiene rubber.

24. The sealant composition of claim 21 wherein the swellable particle is water swellable or oil swellable.

* * * * *